United States Patent

[15] 3,638,601

Hale et al.

[45] Feb. 1, 1972

[54] ACOUSTICALLY TRANSPARENT HYDRODYNAMIC TOWED BODY FOR UNDERWATER EXPLORATION AND THE LIKE

[72] Inventors: Neville E. Hale, Port Credit, Ontario; Kenneth Gardner, Mimico, Ontario, both of Canada

[73] Assignee: Fathom Oceanology Limited, Port Credit, Ontario, Canada

[22] Filed: Aug. 11, 1969

[21] Appl. No.: 848,877

[30] Foreign Application Priority Data

Sept. 3, 1968 Great Britain......................41,756/68

[52] U.S. Cl........................................................114/235 B
[51] Int. Cl...........................................................B63b 21/00
[58] Field of Search..................114/0.5, 235 B, 235.2; 340/7

[56] References Cited

UNITED STATES PATENTS

| 3,144,848 | 8/1964 | Knott et al | 114/235 B |
| 3,224,405 | 12/1965 | Fergusson et al | 114/235 B |

*Primary Examiner*—Trygve M. Blix
*Attorney*—Douglas S. Johnson

[57] ABSTRACT

A submersible towable body for underwater acoustic purposes comprising an acoustically transparent shell which is supported by an internal body structure in the form of an acoustically transparent compartment for receiving a transducer and having a transducer removably mounted in the compartment so that the towed body retains its structural integrity independently of the transducer.

7 Claims, 3 Drawing Figures

PATENTED FEB 1 1972
3,638,601
SHEET 1 OF 2
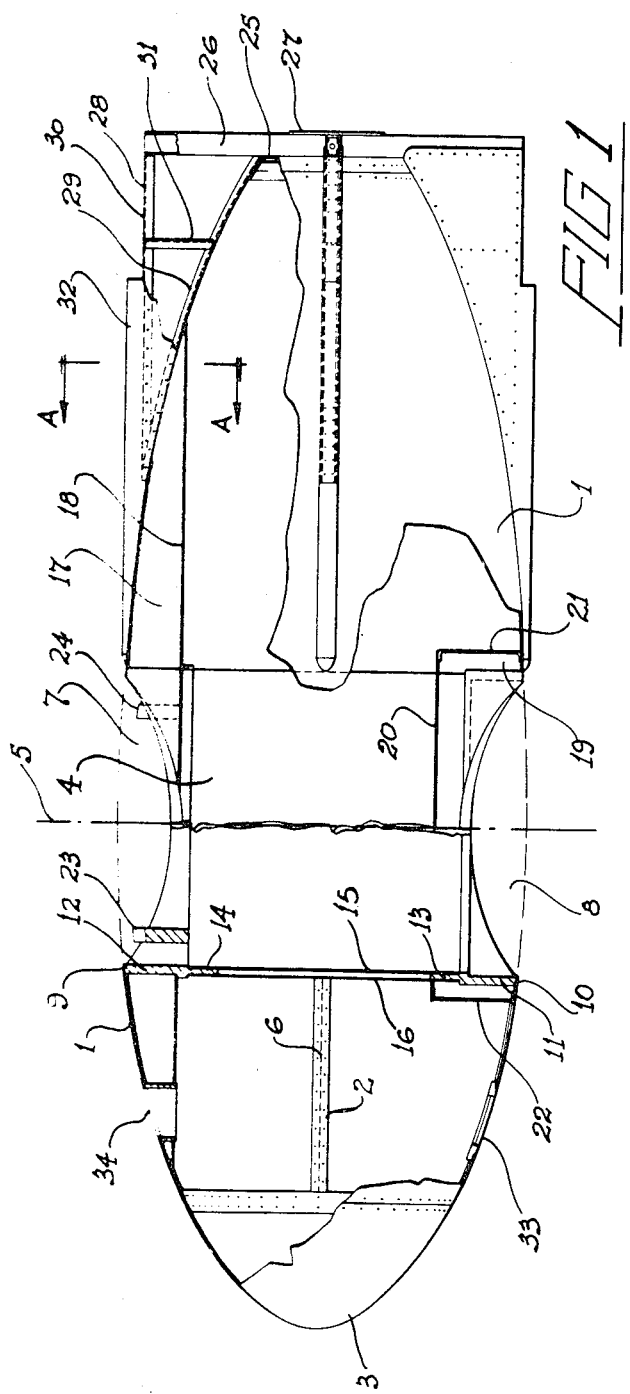
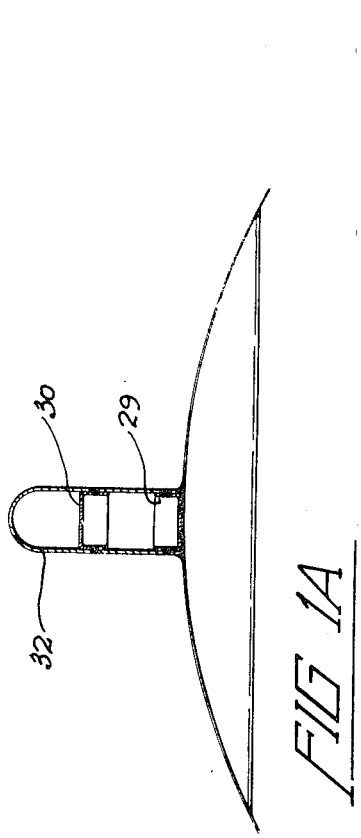
INVENTOR
NEVILLE E. HALE
KENNETH GARDNER
BY Douglas S. Johnson

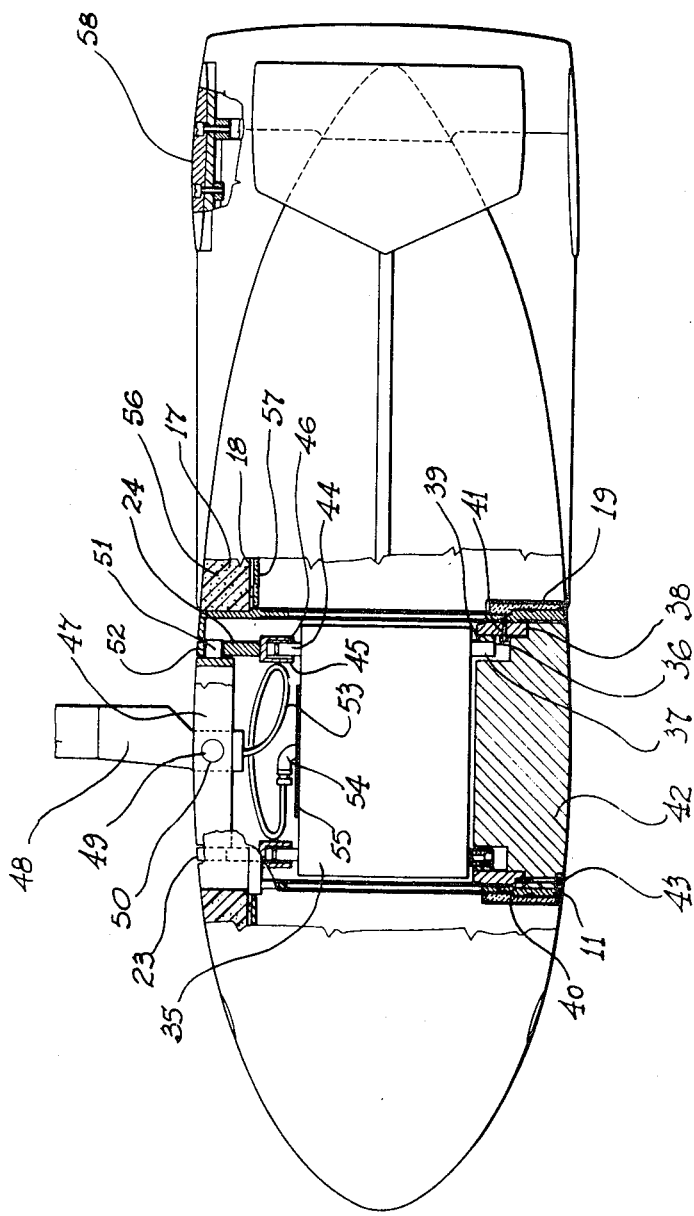

3,638,601

ACOUSTICALLY TRANSPARENT HYDRODYNAMIC TOWED BODY FOR UNDERWATER EXPLORATION AND THE LIKE

FIELD OF THE INVENTION

This invention relates to a towed body incorporating a transducer for underwater acoustic investigations.

DESCRIPTION OF THE PRIOR ART

Towed bodies for underwater acoustic purposes are specialized structures that are required to meet performance specifications in the field of hydrodynamics and acoustics while remaining compatible with structural requirements. Ease of maintenance, particularly maintenance of the electronic equipment contained within the towed body is important. A further requirement is to provide simple means for flooding and draining the body during launching and recovery operations.

A common approach to the structural design of towed bodies is to use the frame of the contained transducer as the principal structural member from which the body skin is supported. This approach, however, causes maintenance problems since the transducer cannot be removed from the body.

The primary objective of our invention therefore is to provide a structurally sound towed body that retains its structural integrity independent from the transducer contained therein in order that the said transducer may be removed for maintenance.

A second important objective is to provide a structure that is substantially transparent to acoustic energy in the underwater environment at the selected operating frequency level.

A third objective is to provide a body that will have low flow noise interference in relation to the transmission and receiving signal level.

A fourth objective is to provide an effective towed body at low cost.

BRIEF DESCRIPTION OF THE DRAWINGS

With these objects in view and such other objects that will become apparent in the following disclosure, we will describe our invention making reference to the following figures in which FIG. 1 is a sectioned side elevation of our towed body showing the basic steelwork structure;

FIG. 1A is a sectional view taken on line A—A in FIG. 1;

FIG. 2 is a fragmented side elevation of a typical embodiment of our invention showing the fitment of the contained transducer in situ.

DESCRIPTION OF THE PREFERRED EMBODIMENTS

Like characters of reference in these figures denote similar parts.

Our towed body is a "teardrop" hydrodynamic form in elevation and a body of revolution in section as shown in FIG. 1. The main body shell comprises four quadrant stretched skins of metal 1 joined by doubler plates 2, being capped at the forward end by a nose cone 3.

A circular drum 4 having an axis 5 normal to the longitudinal body axis 6 is welded to the inner face of upper and lower circular apertures 7 and 8 in the body shell at 9 and 10. This drum 4 provides substantial stiffness to the body shell.

Drum 4 comprises upper and lower rolled steel circular flanges 11 and 12 which have critically machined inwardly facing extremities at 13 and 14. The said flanges 11 and 12 are bridged by a pair of inner and outer thin skins 15 and 16 which are wrapped around the entire periphery of the flanges, thus forming a drumlike structure. The spacing between the skins and the thickness of the skins is selected to provide substantially zero transmission loss at the selected operating frequency, as established by known theory.

An upper compartment 17 is formed by a profiled plate 18 which adjoins the inner surface of the shell 1 around the outer edge of said plate and adjoins flange 12 by means of a suitable circular aperture in said plate. A lower compartment 19 is formed by a similar profiled plate 20 which is however truncated and terminated at transverse bulkheads 21 and 22.

A pair of transverse tow point support members 23 and 24 are located to intersect the inner wall of drum 4 and are welded thereto.

The after end of the body is capped by a flanged disc 25, upon the outer flat side of which is constructed a cruciform hollow rectangular tubelike structure 26, thus forming the main support for four tail fins. The dimensions of the hollow structure are dictated by the requirements for acoustic transparency which are based on known theory. A circular gusset plate 27 provides additional rigidity to the cruciform member 26.

Between each of the cruciform extremities 26 and the body shell 1 is a substantially triangular structure 28 which comprises a lower formed channel 29 welded to the body shell, an upper channel member 30 and a brace 31. This structure is enclosed by a tail skin 32 as shown in section FIG. 1A.

Upper and lower grills 33 and 34 are fitted to the body for draining and flooding purposes.

FIG. 2 shows the towed body and transducer-complex assembly. Transducer 35, which has a circular vertical wall and flat ends, is supported by a vibration and shock-absorbing mounting flange assembly 36. Flange assembly 36 comprises an inner ring 37 bolted to the underside of the transducer 35 and a segmented outer ring 38, said inner and outer rings being attached one to the other by means of a bonded rubber interface member 39. The transducer and mounting flange is inserted into drum 4 until said flange registers on shoulder 40 which is machined into flange member 11. The transducer assembly is then retained by a plurality of radial bolts 41 which engage tapped holes in flange 11.

Lead ballast is provided by a removable cast form 42 that is shaped to fit in the enclosure below the transducer and to match the outer profile of the body. This ballast is held in place by a plurality of bolts 43 that register with tapped holes in the segmented ring 38. Additional permanent ballast is provided by filling compartment 19 with lead.

The upper side of the transducer 35 has outwardly projecting location dowels 44 that register with dowel cups 45. The dowel cups are lined with vibration absorbing liners 46 and are firmly attached to crossbar members 23 and 24.

A tow point gimbal assembly 47 provides both fore and aft and athwartships pivoting of the tow staff 48 relative to the body. This is accomplished by means of transverse stub shafts 49 on the tow staff which locate in the side plate bearings 50 and axially aligned stub shafts 51 which locate in bearings 52 bored in crossbars 23 and 24.

The electrical pigtail from the tow cable 53 is coiled below the tow point with sufficient length to permit the removal of the towed body. This pigtail enters the transducer through a watertight gland 54 and connects to the transducer circuit by means of a dry plug within the transducer enclosure (not shown). Thus the removal of the transducer may be accomplished by first removing the lead ballast 42, removal of bolts 41 and withdrawal of the transducer to the limit of the coiled pigtail. Gland plate 55 may then be removed from the transducer to provide access to the dry plug which may then be separated to free the transducer from the system.

Compartment 17 is filled with a microballoon/epoxy compound 56 which provides a rugged strongback and impact strength to the body for launching and recovery operations.

This compartment also forms an acoustic reflector to prevent ships noise from entering the body during towing. An acoustic absorber 57 attached to the underside of plate 18 prevents the acoustic beam from becoming distorted by reflector 56.

The hydrodynamic stability of the body is achieved by four end plates 58 which are bolted to the tail fin structure earlier described. These end plates 58 must be designed for acoustic transparency at the particular frequency of operation. In most cases a solid material suitably profiled may be used. This, however, must be selected on the basis of the physical properties of the end plate material, the angle of incidence at which the wave passes through the end plate and the transmission frequency. These calculations may be based on known theory.

An important benefit of the structure described prevents crossflow of water contained within the body occuring between the flooding and draining ports 33 and 34 and the tow point aperture. This is of course achieved by the fact that drum 4 separates the contained water surrounding the transducer and the tow point area and the contained water in the main structure of the body.

The invention discussed herein has been described substantially in terms of components used. We do not however wish the said invention to be restricted to the precise arrangement of parts described since this disclosure is intended to explain a workable construction illustrating the concept, and is not for the purpose of limiting the invention to any subsequent embodiment or details thereof.

We claim:

1. A submersible, towable body comprising an acoustically transparent shell, a body support structure in the form of an acoustically transparent compartment within said shell, said acoustically transparent compartment comprising upper and lower flanges and a pair of skins forming a drumlike structure between them so that the compartment is acoustically transparent at least at selected frequencies, and a transducer removably mounted in said compartment.

2. A submersible, towable body according to claim 1, wherein said shell is floodable.

3. A submersible, towable body according to claim 1, having a tow point on the body support structure.

4. A submersible, towable body according to claim 1, wherein the polar axis of said compartment is substantially disposed at right angle to the longitudinal axis of said shell.

5. A submersible, towable body according to claim 1, wherein said support structure is a cylindrical drum.

6. A towable body according to claim 5, wherein the extremities of said drum are profiled for mutual registration with the surface of said shell.

7. A submersible, towable body according to claim 1, having removable ballast on the lower side of said body support structure.

* * * * *